INVENTOR.
James H. Chamberlain
BY Donald W. Phillion
HIS ATTORNEY

March 22, 1960

J. H. CHAMBERLAIN

CONTROL CIRCUIT 2,929,259

Filed March 19, 1956

2 Sheets-Sheet 2

INVENTOR.
James H. Chamberlain
BY
Donald W. Phillion
HIS ATTORNEY 2,929,259

CONTROL CIRCUIT

James H. Chamberlain, Park Ridge, Ill., assignor to Admiral Corporation, Chicago, Ill., a corporation of Delaware Application March 19, 1956, Serial No. 572,332

4 Claims. (Cl. 74—472)

This invention relates generally to the selection of predetermined frequency channels, and more specifically to apparatus for automatically selecting predetermined frequency channels as, for example, in a television receiver.

In the prior art, there are several structures available for automatically selecting predetermined frequency channels, either at the receiver or from a remote location as, for example, across the room from the receiver. Most of these structures comprise a motor which is energized by some control circuit means to drive the tuning mechanism from one preselected channel to the next predetermined channel, while skipping over the unwanted channels thereinbetween. For example, in a television receiver, in which the tuner mechanism is usually mounted on a rotatable shaft, the automatic channel selecting apparatus could be preset to rotate the shaft sufficiently to switch the tuner from channel 4 to channel 7, skipping over channels 5 and 6. These prior art structures exhibit differing operating characteristics. For example, some exhibit the characteristic whereby when the operator attempts to turn the control knob manually the motor will become energized and will take over control of turning the tuner to the next preset channel. Thus, the operator cannot select any channels inbetween the predetermined channels, should he desire to do so. Other devices are constructed so that the set can be turned manually only in one direction. This system has obvious disadvantages. Still other devices are complicated and expensive and require a relatively large amount of space.

One object of the present invention is to provide a relatively simple and inexpensive apparatus for automatically selecting predetermined frequency channels.

Another object of the invention is to provide a relatively simple apparatus for automatically selecting predetermined frequency channels, and which will also permit manual control of the tuner structure without energizing the driving motor.

A further object of the invention is to provide a relatively simple apparatus for automatically selecting predetermined frequency channels of a television set, and which will permit the operator to manually select the channels by turning the channel selection control knob in either direction without causing energization of the driving motor.

A fourth object of the invention is the improvement of automatic frequency channel selectors generally.

In accordance with the invention, there is provided a prime mover such as a motor, and means including disengagable coupling means such as a clutch mechanism for supplying the torque of the prime mover to the rotatable shaft upon which a tuner structure may be mounted and whose angular position is to be automatically controlled. A first circuit means comprising a switch functions to supply an energizing potential to the motor when said switch is closed initially. A holding circuit comprising first and second contact means is provided to maintain the supply of energizing potential to said motor as long as both contact means are closed. The said first contact means is arranged to be opened by mechanical means coupled to said shaft when said shaft is in one of a plurality of preselected angular positions, and to be closed when the shaft is between said preselected angular positions. Thus, in order to close the first contact means, the motor must be initially energized by closure of said switch, to turn the shaft to a position between the predetermined angular positions.

The said second contact means is constructed and arranged to become closed in response to energization of said motor, and to remain closed only during the time the motor is energized. Thus, the holding circuit will be completed only during the time the motor is energized. This permits manual turning of the shaft without causing energization of the motor, since the motor is then never initially energized to permit completion of the holding circuit. In automatic operation, the holding circuit, once completed, will remain so until said first contact means is opened by a mechanical member, which occurs when the shaft reaches its next preselected angular position.

In accordance with a feature of the invention, the operation of said second contact means can be controlled by the motor armature and armature shaft structure which is displaced along its axis by some means, such as a spring, when the motor is de-energized. When the motor is energized, the magnetic force of the field coils will overcome the force of the spring and draw the armature more completely inbetween the field yokes. This movement of the armature and its shaft will, at one end of the shaft, cause engagement of the aforementioned disengagable coupling means, and at the other end thereof will cause said second contact means to close. When the motor is de-energized, the armature again will be caused to move along its axis by the force of the spring, so as to disengage the coupling means and to open said second contact means.

These and other objects and features of the invention will be more fully understood when read in conjunction with the drawings, in which.

Figure 1:
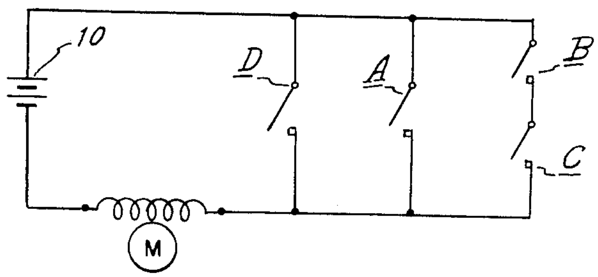
Fig. 1 is a schematic diagram of the electrical circuit of the invention.

Referring now to Fig. 1, there is shown a schematic sketch of the electrical circuit of the invention. A brief description of this circuit will be given so as to enable the reader to more fully understand how the the circuit performs its part in the diagram of the invention shown in Fig. 2. To facilitate identification, corresponding elements of the various figures have been given the same reference characters (although primed or double-primed as they appear in successive figures).

In Fig. 1 the motor M can be energized by the battery 10 through three different paths. The first of these paths is completed by closure of switch D, the second is completed by closure of switch A, and the third path, which constitutes the holding circuit, can be completed by the closure of both switches B and C.

Switches A and D, one of which is located at the receiver and one of which can be located at a remote point as, for example, across the room from the receiver, are actuated manually by the operator to produce the initial energization of the motor M. When the motor M becomes energized, certain mechanical movements take place in the mechanism of Fig. 2, so that switches B and C become closed until the shaft 11 (Fig. 2) reaches its next preselected angular position, at which time the switch C will open, followed immediately by the opening of switch B. As will be seen more clearly later, switch B is provided solely to permit manual control of the tuner without causing energization of the motor M.

Figure 2:
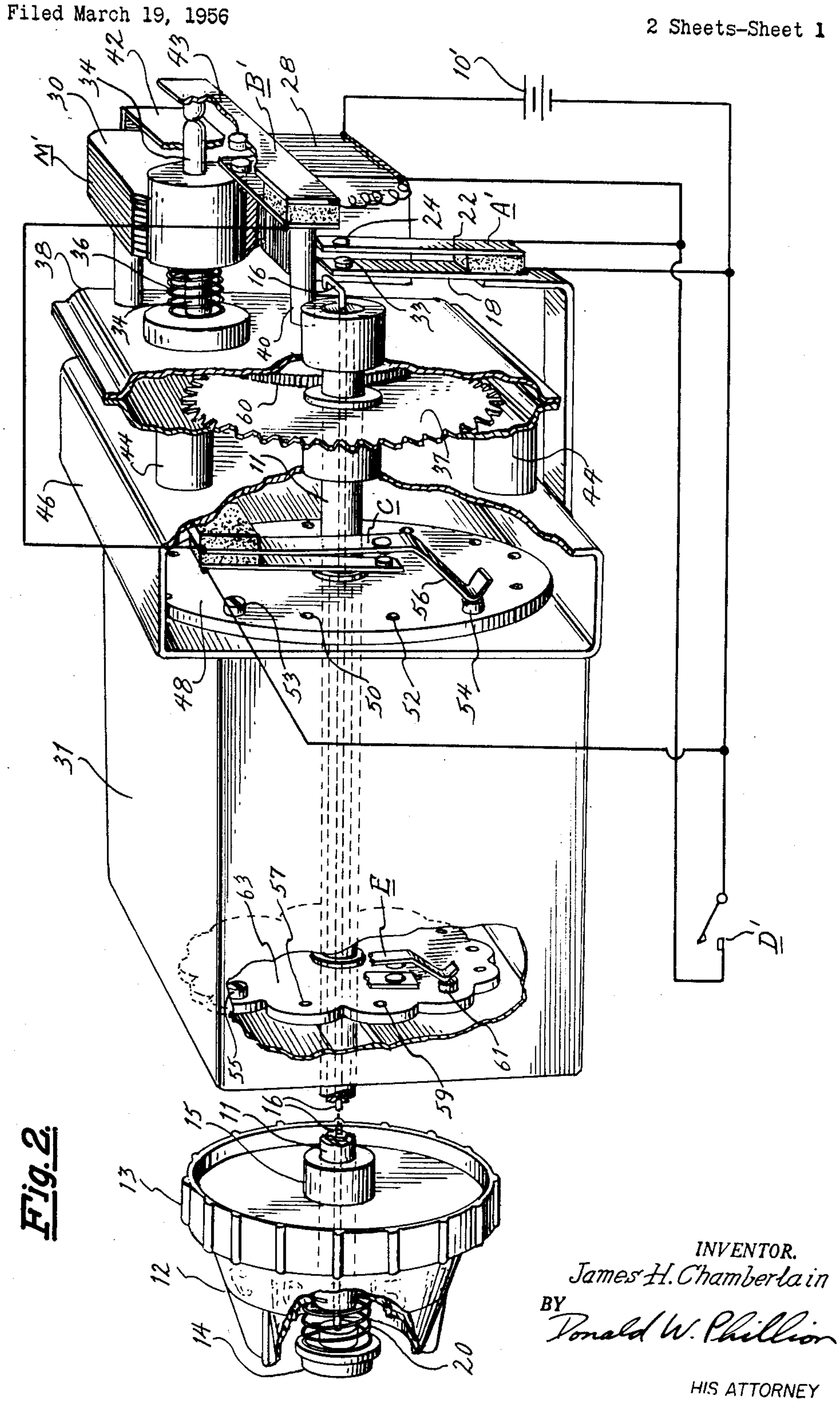
Fig. 2 is a perspective view of the invention, including the electrical circuit shown in Fig. 1.

Referring now to Fig. 2, there is shown an embodiment of the invention, which can be used in a television receiver. The housing 31 can contain a tuner which is controlled in a conventional manner by the shafts 11 and 15, which have manual controls 12 and 13 secured to the ends thereof for obtaining channel selecting and fine tuning, respectively. The small button 14 on the manual control 12 is connected to small diameter rod 16, which runs through the entire length of the shaft 11 and terminates just short of leaf 18 of the contacts A′, also referred to herein as a switch. The button 14 can be spring-loaded by some means such as spring 20, so that the rod 16 normally does not apply pressure to the leaf 18. However, when the button 14 is depressed, the rod 16 is moved forward to cause the contact 33 on leaf 18 to make contact with the contact 24 on leaf 22. This supplies battery 10′ across the field winding 28, which is wound on the magnetic core or yoke 30 of the motor M′. Motor M also comprises armature 32 and armature shaft 34. The yoke 30 is mounted on the housing structure 38 by mounting pins 40. One end of armature shaft 34 is mounted in the housing 38 and the other end is mounted in the bracket 42, which is secured to the yoke 30. When the field winding 28 is not energized, the spring 36 forces the armature to the right in the structure of Fig. 2, so that it is somewhat displaced along its axis with respect to yoke 30. In this position the armature shaft 34 presses against the leaf 43 of switch B to open the contacts thereof. Further, in this position of the armature shaft 34 the coupling mechanism (shown in detail in Figs. 3 and 4) is not engaged. When the field winding 28 is energized, the magnetic field created across the gap of the yoke 30 forces the armature to the left in Fig. 1, so that the normally open contacts of switch B′ become closed and the coupling mechanism becomes engaged in a manner to be described later.

Contained in the housing structure 38 is the coupling mechanism (see Figs. 3 and 4) and the gear train (of which gear 37 is a portion). Housing structure 38 is supported by mounting posts 44 to the bracket 46, which in turn is secured to the tuner housing 31. In the bracket 46 is a disc 48 which is secured to the shaft 11 and rotates therewith. A series of threaded holes, such as holes 50 and 52, are positioned around the edge thereof. There are 13 such holes, each of which corresponds with one of the 13 channel positions of the selector switch of a current television receiver. Into certain preselected ones of these holes, corresponded to the channels to be automatically selected, screws are inserted such as screws 53 and 54. The disc 48 is mounted on shaft 11 so that when the tuner is tuned to the channel corresponding to the hole in which a screw such as screw 54 is inserted, the spring armature 56 will be forced away from the disc 48 by the screw 54, to open the normally closed switch C′. This will open the holding circuit to de-energize the motor and thus cause the shaft 11 to stop at that particular angular position, which will cause the tuner to be tuned to a particular preselected channel. The screw 54 will hold the switch C open until the operator closes switch A′ again, at which time the motor M′ will again become energized and begin to rotate, thus closing the switches B′ and C′ to again complete the holding circuit for the motor M′. It is to be specifically noted that it is not necessary to continue depressing the button 14 after the holding circuit has been completed. Once the holding circuit is closed the motor M′ will continue to rotate until the disc 48 turns another screw under the V-portion of the spring armature 56 to open the switch C′.

Figures 3, 4:
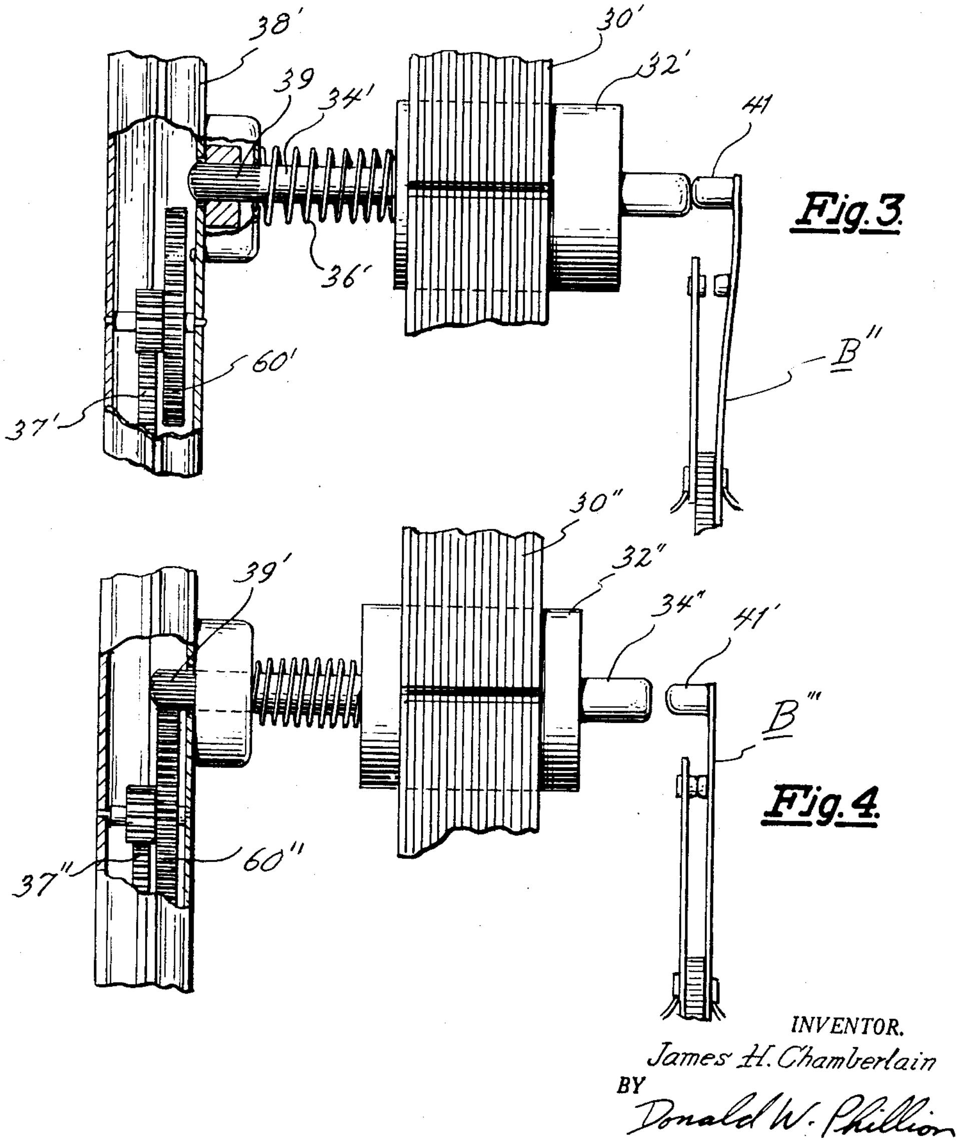
Fig. 3 is a sketch of the spring loaded armature when the motor is de-energized.
Fig. 4 is a sketch of the spring loaded armature when the motor is energized.

Referring now to Figs. 3 and 4, there are shown views of the coupling mechanism when the motor is de-energized and when it is energized. This coupling mechanism, which is located inside the housing 38′, comprises the gear teeth 39 cut into the end of the armature shaft 34′ and the gear 60, which is linked mechanically to the main shaft 11 (Fig. 2). In Fig. 3, which illustrates the condition of the coupling mechanism when the motor is deenergized, it can be seen that gear teeth 39 are not meshed with the gear 60 because of the action of the spring 36′, which causes the armature 32′ to be displaced along its axis (to the right in Fig. 3). It can further be seen that this displacement of the armature 32′ causes the other end of the armature shaft 34′ to press upon the nub 41 to open contact B″, thus breaking the holding circuit.

In Fig. 4, which illustrates the existing conditions when the motor is energized, the armature 32″ is pulled to the left in the figure by the action of the magnetic field created by the yoke 30″. The geared end of the armature shaft engages the gear 60′ and the other end of the armature shaft 34″ is caused to move away from the nub 41′ so that the switch B‴ is closed.

It can thus be seen in Fig. 2 that as soon as the motor M′ is energized the switch B′ becomes closed; and the switch C′ will also become closed as soon as the motor rotates sufficiently to cause the screw 54 to move out from under the contact point of the spring armature 56. Since, as described hereinbefore, closure of both switches B′ and C′ will complete the holding circuit for maintaining energization of the motor M′, the said motor will remain energized until the switch C′ is caused to be opened by the next occurring screwhead passing under the apex of the V-shaped portion of the spring armature 56.

Also, as indicated before, the switch B′ functions to permit manual operation of the control 12 without causing energization of the motor M′. This occurs in the following manner: If the motor M′ is not initially energized by closing either the switch A′ or the switch D′ (which is an alternative to switch A), the switch B′ cannot become closed and, consequently, the holding circuit which comprises switch B′ and switch C′ cannot become completed. If the holding circuit is not completed, the motor M′ will not become energized. Thus, since operation of the control knob 12 closes neither switch A′ nor switch D′, the said control knob can be operated manually in either direction without energizing the motor M′.

It is to be noted that switch D′ may be employed in lieu of switch A′ to supply initially the energizing battery 10′ to the field winding 28. Switch D′, which is connected in parallel with switch B′ with respect to the battery 10′, may be connected to the receiver by a long connecting cord, and thus permit an operator to control the selection of channels from a remote point.

The disc 48 represents but one of many ways to perform the function of controlling switch C′. Many other structures may be adopted for this function. For example, if the invention is employed in a television receiver, one of the discs inside the tuner housing 10 may be employed. More specifically, in most tuners there is provided a ratchet type disc, such as disc 63, which is employed to lock the tuner in its various positions. This ratchet type may be adapted to activate a switch E which would take the place of switch C. Similar to disc 48, the disc 63 can have threaded holes, such as holes 57 and 59, corresponding to the different channels. Screws, such as screws 55 and 61, can be placed in the various holes in accordance with the channels to be automatically selected. The switch E would be activated by these screws in the same manner as described in connection with the switch C′ and the disc 48.

It is to be noted that the forms of the invention shown and described herein are but preferred embodiments of the same and that various changes can be made, both in the mechanical arrangement and in the electrical system, without departing from the spirit or scope of the invention.

I claim:

1. Means for automatically controlling the angular position of a rotatable member comprising mechanical means operably associated with said rotatable member to be actuated when the latter is at selected angular positions, a driving member in the form of an electric motor, means including mechanical coupling means responsive only to the actuation of said motor for operably associating said driving member with said rotatable member for driving the latter to a preselected position, a source of power for energizing said motor, first switch means for connecting said source of power to said motor, second and third switch means connected in series between said motor and said source of power and adapted when closed simultaneously to constitute a holding circuit to energize said motor from said source independently of said first switch means, said second switch means being normally biased open and being closed in response to actuation of said motor, said third switch means being normally biased closed and being opened in response to the actuation of said first mechanical means.

2. In a system for controlling the operation of an electric motor for driving a rotatable member to preselected positions, a driving member in the form of an electric motor, a driven member adapted to be rotated to preselected positions, mechanical coupling means between said driving and driven members, said coupling means being responsive to actuation of said motor for driving said driven member by said driving member, a source of power for energizing said motor, first switch means for connecting said source of power to said motor, second and third switch means connected in series between said motor and said source of power and adapted when closed simultaneously to constitute a holding circuit to energize said motor from said source independently of said first switch means, said second switch means being normally biased open and being closed in response to the actuation of said motor and said third switch means being normally biased closed and being opened in response to a preselected position of said driven member.

3. In a system for controlling the operation of a motor for driving a driven member to preselected positions, an electric motor having a rotor constituting a driving element, a driven element mounted for rotation to preselected positions, resilient means for holding said rotor in a preselected axial position when said rotor is de-energized but responsive to the energization of said motor to permit said rotor to shift axially to another position, driving means between said rotor and said driven element engaged when said rotor is shifted during energization of said motor and disengaged when said motor is deenergized and said rotor is shifted to the other position, a source of power, first switch means for connecting said source of power to said motor, a holding circuit for connecting said source of power to said motor independently of said first switch means, said holding circuit comprising a second switch means and a third switch means, said second switch being responsive to axial shifting of said rotor when said motor is energized to be operated to a closed position and to be opened when said motor is de-energized and when said rotor shifts in the opposite direction, said third switching means being responsive to preselected positions of said driven element to be moved to open position.

4. In a system for controlling the operation of a motor for driving a driven member to preselected positions, an electric motor having a rotor shiftable axially between two extreme positions, means for resiliently urging said rotor to one position when said motor is de-energized and for permitting shifting of said rotor to the other axial position when said motor is energized, a source of electrical power, mechanical driving means between said rotor and said rotatably driven member engagable for mechanically coupling said rotor to said driven element only when said rotor is shifted axially during energization of said motor, first switch means for connecting said motor to said source, second and third switch means connected in series between said motor and said source of power and adapted when closed simultaneously to constitute a holding circuit to energize said motor from said source independently of said first switch means, said second means being normally biased open and being closed in response to the shifting of said rotor, said third switch means being normally biased closed and being opened in response to a preselected position of said driven element.

References Cited in the file of this patent

UNITED STATES PATENTS

| | | |
|---|---|---|
| 2,320,628 | Mahnken | June 1, 1943 |
| 2,453,251 | Newman | Nov. 9, 1948 |
| 2,637,835 | Davidson | May 5, 1953 |
| 2,710,935 | Luebkind | June 14, 1955 |
| 2,730,671 | Van Ryan | Jan. 10, 1956 |
| 2,757,550 | Weinfurt | Aug. 7, 1956 |

Notice of Adverse Decision in Interference

In Interference No. 93,945 involving Patent No. 2,929,259, J. H. Chamberlain, CONTROL CIRCUIT, final judgment adverse to the patentee was rendered Oct. 21, 1964, as to claim 3.

[*Official Gazette May 18, 1965.*]